May 30, 1939.　　　L. L. SMALLEY　　　2,160,092
BRAKE TESTER
Filed June 12, 1936　　　3 Sheets-Sheet 1
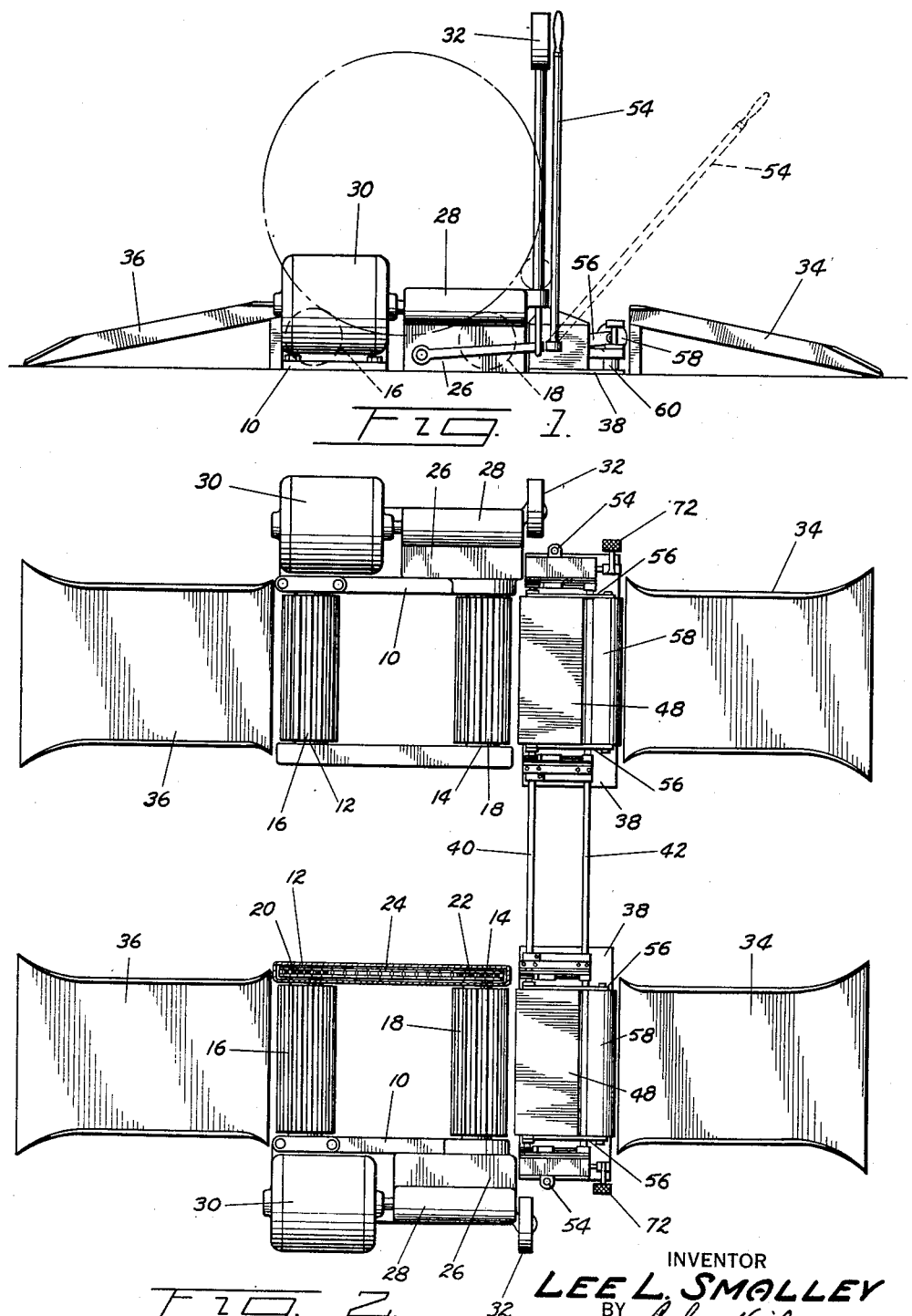
INVENTOR
LEE L. SMALLEY
BY R. E. Wilson
ATTORNEY

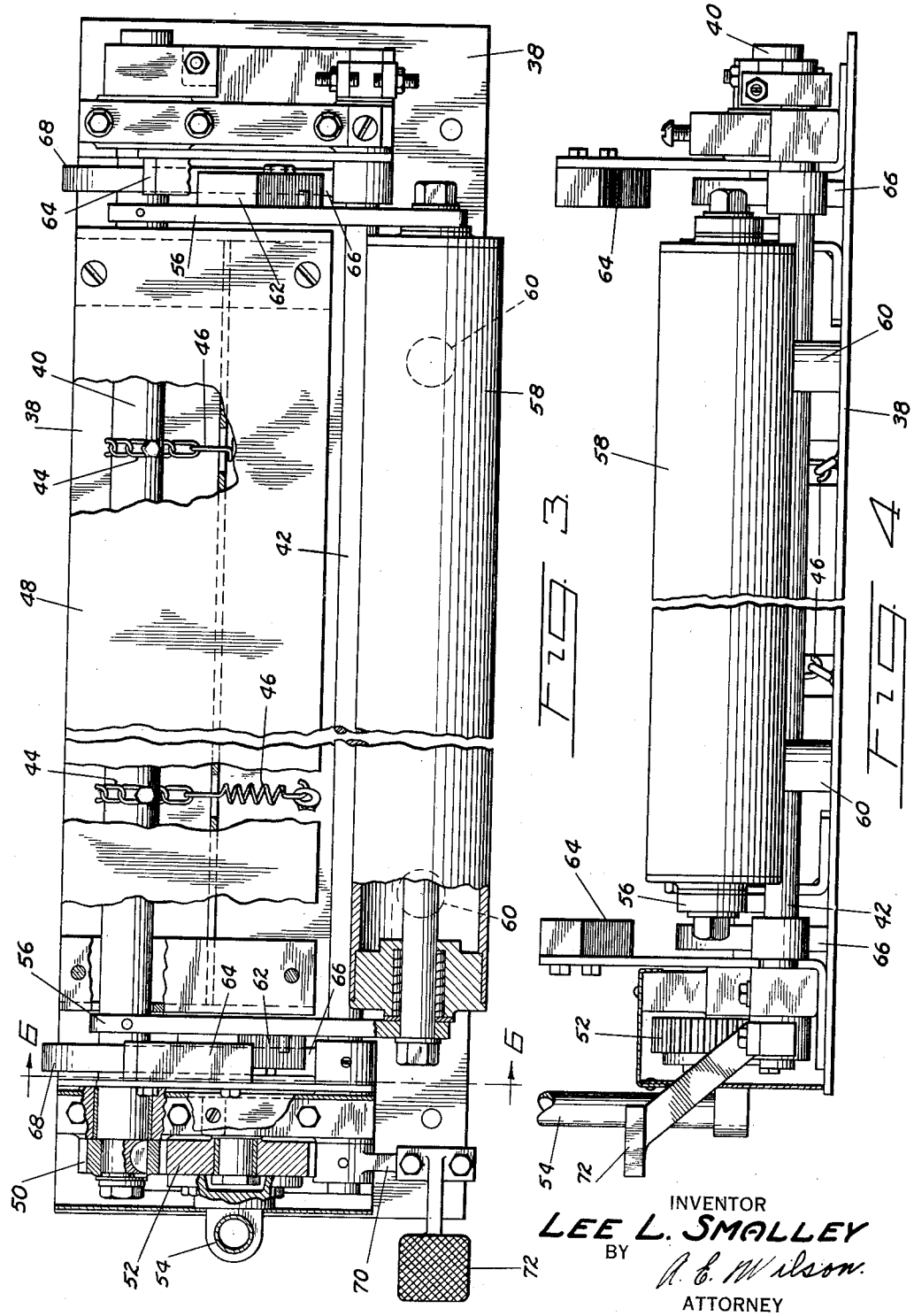

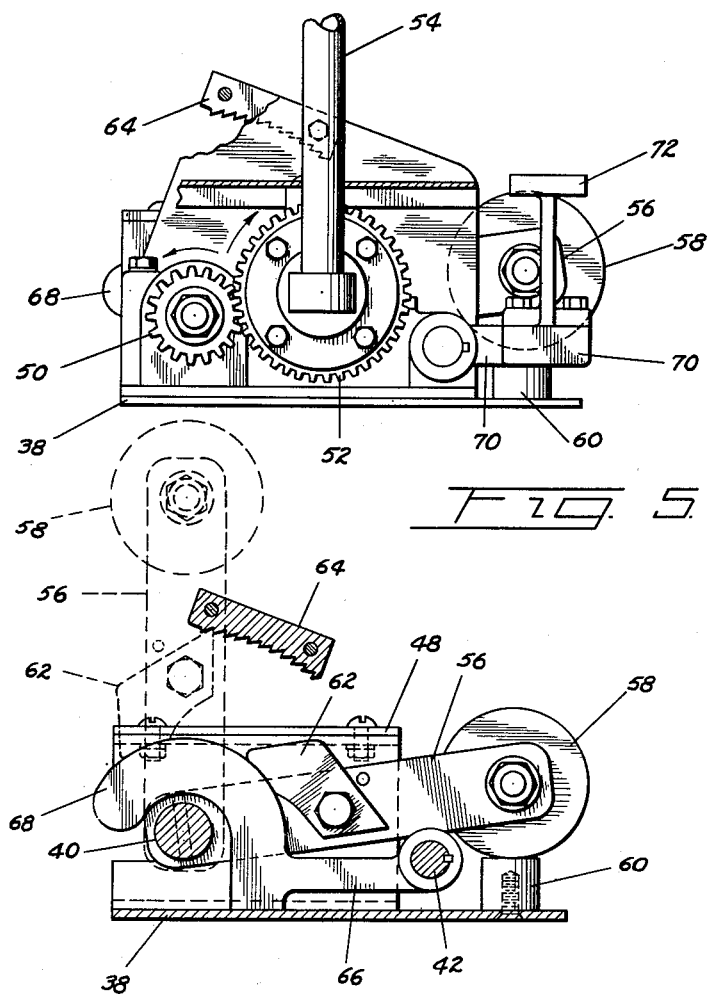

Patented May 30, 1939

2,160,092

UNITED STATES PATENT OFFICE 2,160,092

BRAKE TESTER

Lee L. Smalley, South Bend, Ind., assignor to Bendix Products Corporation, South Bend, Ind., a corporation of Indiana Application June 12, 1936, Serial No. 84,939

5 Claims. (Cl. 73—51)

This invention relates to brake testing apparatus, and more particularly to devices for retaining the wheels of a vehicle on a brake testing apparatus during a brake testing operation.

Broadly the invention comprehends a brake testing unit of conventional type including spaced rollers for supporting and rotating a wheel against the resistance of its associated brake and apparatus associated therewith for retaining the wheel upon the rollers during the testing operation.

The invention will be best understood by reference to the following description, when taken in connection with the accompanying drawings of one illustrated embodiment thereof, while its scope will be more particularly pointed out in the appended claims.

In the drawings:—

Fig. 1 is a side elevation of a brake testing apparatus having associated therewith a retaining mechanism embodying the invention;

Fig. 2 is a top plan view of a brake testing apparatus including two brake testing units arranged in spaced parallel relation to one another and having associated therewith the retaining mechanism;

Fig. 3 is an enlarged top plan view of the retaining mechanism, partly broken away, and partly in section;

Fig. 4 is an enlarged end elevation of the retaining mechanism;

Fig. 5 is an enlarged side elevation with the gear casing removed; and

Fig. 6 is a sectional view substantially on line 6—6, Fig. 3.

In the illustrated embodiment of the invention, a brake testing apparatus of conventional type includes two corresponding oppositely disposed units arranged for simultaneously testing the brakes associated with a pair of oppositely disposed vehicle wheels. Each of these units includes a base 10, which may be of any desirable structure. Journaled on the base are shafts 12 and 14 arranged in spaced parallel relation to one another. Transversely of the base and suitably secured to the shafts are corresponding rollers 16 and 18.

One end of the shaft 12 has keyed thereto a sprocket wheel 20 and the corresponding end of the shaft 14 has keyed thereto a sprocket wheel 22, and these sprocket wheels are connected by a sprocket chain 24 so that rotation of one of the shafts may be transmitted to the other shaft. The other end of the shaft 14 is connected through a suitable transmission dynamometer 26 and a speed reduction mechanism 28 to a motor 30, and the dynamometer has suitably connected thereto a gauge 32 for indicating the torque imposed on the testing assemblage by the application of a brake associated with a wheel supported on and driven by the rollers.

At the approach end and at the rear end of the brake testing units are ramps 34 and 36 on which the wheels of a vehicle travel when moving onto and off of the rollers 16 and 18. The ramps 34 at the approach end of the apparatus are spaced from the brake testing units, and positioned in this space is a mechanism for retaining the wheels on the rollers while the brakes associated with the wheels are under test.

The retaining mechanism includes two corresponding units, one associated with each brake testing unit, and these units may be interconnected for simultaneous operation as shown in Fig. 2. Each of the retaining units comprises a frame 38, suitably anchored in position or secured to the brake testing unit. The frame has journaled thereon shafts 40 and 42 arranged transversely of the frame and in spaced relation to one another. In instances where it is desirable to couple the retaining units for simultaneous operation, the shafts 40 and 42 are in common to the respective units. Since the units are identical, the description of one will suffice for the other.

The shaft 40 has secured thereto the corresponding ends of short chain sections 44, the other ends of which are connected by coil springs 46 to the frame, and a suitable cover plate 48 is bolted or otherwise secured to the frame over the shafts. One end of the shaft 40 has suitably secured thereto a pinion 50 in mesh with a large gear 52 journaled on the frame, and suitably secured to this large gear is an operating lever 54 normally held in retracted or vertical position by the force of gravity which overcomes the counterbalancing springs 46. As illustrated on Figure 3, the springs 46 exert a force tending to rotate the shaft 40. This force is transmitted through the pinion 50 and gear 52 to oppose the force of gravity urging the roller 58 to the inoperative position. When the roller 58 is moved to the inoperative position at which time the lever 54 is moved to the vertical position, the springs 46 are extended to cushion the load of the roller 58. When the roller 58 is raised to the operative position, shown by dotted lines on Figure 1, the force of the springs 46 is available to assist the operator in moving the roller 58 against the force of gravity thereof.

Keyed to the shaft 40 adjacent the respective ends of the cover plate 48 are corresponding arms 56 supporting for rotation a roller 58. This roller normally rests on rubber blocks 60 secured to the base of the frame. Pivoted on the arms 56 are corresponding oppositely disposed pawls 62 arranged for coperation with the corresponding ratchets 64 suitably secured to the frame. Actuation of the lever 54 drives the train of gears connecting this lever to the shaft 40. This causes rotation of the shaft 40, resulting in elevating the arms 56 and thereby moving the roller 58 from its position of rest into engagement with the tire of a wheel, the brake of which is to undergo a test. As the roller is moved into engagement with the tire, the pawls 62 engage the ratchets 64 and secure the arms 56, and hence the roller 58, against movement.

Keyed or otherwise secured to the shaft 42 are corresponding arms 66 having arcuate extremities 68 arranged for cooperation with the pawls 62. The shaft 42 also has secured thereto an arm 70 to which is attached a foot pedal 72. By depressing the foot pedal, the arms 66 are actuated to engage their arcuate extremities 68 with the pawls 62 and to move the pawls out of engagement with the ratchets. The arcuate extremities 68 of the arms 66 also serve to retain the pawls 62 disengaged from the ratchets during the return of the operating lever 54 to its retracted position and the return of the roller 58 to its position of rest.

Although this invention has been described in connection with certain specific embodiments, the principles involved are susceptible of numerous other application that will readily occur to persons skilled in the art. The invention is, therefore, to be limited only as indicated by the scope of the appended claims.

Having thus described the various features of the invention, what I claim as new and desire to secure by Letters Patent is:

1. In an apparatus of the class described, a brake testing unit including a plurality of rollers for supporting and rotating a wheel, a retaining roller, means for moving the retaining roller into the path of the wheel including a train of gearing, hand operated means for driving the gearing, means for locking the retaining roller in wheel retaining position, and a foot operated lever means for tripping the locking means.

2. In an apparatus of the class described, a brake testing unit including a plurality of rollers for supporting and rotating a wheel, a retaining roller, means for moving the retaining roller into the path of the wheel including a train of gearing and a lever for actuating the gearing, means for locking the retaining roller in wheel retaining position, and means, independent of said lever, for tripping the locking means including a manually operated lever, to enable the retaining roller to return to its position of rest due to the action of gravity.

3. In an apparatus of the class described, a pair of oppositely disposed brake testing units each including a plurality of rollers for supporting and rotating a wheel, a pair of corresponding retaining rollers one associated with each unit, means for moving the retaining rollers to engage the wheel when seated on the supporting rollers including a train of gearing and a lever for driving the gearing, means for locking the retaining rollers in wheel retaining positon, and means, independent of said lever, for tripping the locking means including a manually operated lever, to enable the retaining rollers to return to their position of rest due to the action of gravity.

4. In an apparatus of the class described, a brake testing unit including a pair of rollers for supporting and rotating a wheel against the resistance of its associated brake, means for retaining the wheel upon the rollers comprising a shaft, arms keyed to the shaft, a roller rotatably supported on the arms, a pinion keyed to the shaft, a gear in mesh with the pinion, a lever for actuating the gearing, ratchets arranged in a fixed position, pawls carried by the arms cooperating with the ratchets for holding the retaining roller in wheel retaining position, a second shaft, arms keyed thereto for actuating the pawls, and a lever for actuating the second-mentioned shaft.

5. In an apparatus of the class described, a brake testing unit including a pair of spaced rollers for supporting and rotating a wheel against the resistance of its associated brake, means for retaining the wheel against displacement during rotation thereof comprising a shaft, corresponding arms keyed to the shaft in spaced relation to one another, a roller rotatably supported by the arms transversely of the path of the wheel, tension means tending to rotate the shaft, a pinion keyed to the shaft, a gear in mesh with the pinion, a hand lever for actuating the gear, a pair of fixed ratchets, pawls on the arms arranged for cooperation with the ratchets, a second shaft, arms keyed to the second shaft for disengaging the pawls from the ratchets, and a foot pedal lever for rotating the second shaft.

LEE L. SMALLEY.